United States Patent
Irons et al.

[15] 3,693,072
[45] Sept. 19, 1972

[54] FERROMAGNETIC RESONANCE MAGNETOMETER

[72] Inventors: Henry R. Irons, Adelphi; Leonard J. Schwee, Silver Spring, both of Md.

[73] Assignee: The United States of America as represented by the Secretary of the Navy

[22] Filed: Aug. 25, 1967

[21] Appl. No.: 663,454

[52] U.S. Cl. ................................................324/0.5 R
[51] Int. Cl. ..............................................G01r 33/08
[58] Field of Search.......................................324/0.5

[56] References Cited

UNITED STATES PATENTS

| | | | |
|---|---|---|---|
| 3,100,866 | 8/1963 | Zimmerman | 324/0.5 |
| 3,158,802 | 11/1964 | Jung | 324/0.5 |
| 3,227,944 | 1/1966 | Hasty | 324/0.5 |
| 3,239,754 | 3/1966 | Odom | 324/0.5 |
| 3,441,837 | 4/1969 | Desormiere | 324/0.5 |
| 3,320,554 | 5/1967 | Wieder | 324/0.5 UX |

OTHER PUBLICATIONS

J. P. Gordon – Variable Coupling Reflection Cavity For Microwave Spectroscopy – Rev. of Sci. Instr. – 32(6)– June, 1961, pp. 658– 661.

R. M. Rogers & R. H. Kantor – Frequency Shift Magnetometer – Rev. of Sci. Instr. – 32(11) – Nov. 1961 – pp. 1230– 1234

*Primary Examiner*—Michael J. Lynch
*Attorney*—R. S. Sciascia, J. A. Cooke and S. Sheinbein

[57] ABSTRACT

A magnetometer having a thin-film sensor positioned near or at the end of a transmission line and biased near its ferromagnetic resonance. An electromagnetic signal is applied to the thin-film sensor. The reflected portion of this signal is amplitude modulated by the influence of an external magnetic field on the thin-film sensor, and then detected to provide a measure of the external magnetic field.

7 Claims, 6 Drawing Figures

INVENTORS
Henry R. Irons
Leonard J. Schwee

BY J. O. Tresansky
ATTORNEY

FERROMAGNETIC RESONANCE MAGNETOMETER

BACKGROUND OF THE INVENTION

The present invention relates to magnetometers and more particularly to a ferromagnetic resonance magnetometer for measuring magnetic fields.

In the art of magnetometers using thin-film sensors, it has been a general practice to operate near a resonance determined by thin-film inductors and capacitors. The prior art magnetometers also use high Q circuits and low carrier frequencies which tends to limit the response time of the magnetometer. The use of such high Q circuits and low carrier frequencies also requires that the electronic components of the magnetometer be located close to the thin-film sensor, thus making field use difficult in some applications.

While prior art magnetoresistive magnetometers have been satisfactory for high frequency applications, they require electrical connections to be made to the thin-film sensor. Bridge techniques were required to modulate the carrier signal thus resulting in much waste of the carrier level and hence a lower index of modulation for the same carrier signal strength.

SUMMARY OF THE INVENTION

Accordingly, one object of the present invention is the provision of a new and improved ferromagnetic resonance magnetometer.

Another object of the present invention is the provision of a new and improved magnetometer for detecting external magnetic fields by utilizing the impedance of a thin-film sensor itself.

A further object of this invention is the provision of a new and improved magnetometer with fast response time and high sensitivity.

Still another object of the present invention is the provision of a new and improved magnetometer which is particularly adaptable for field use.

Another still further object of the instant invention is the provision of a new and improved magnetometer for readily measuring magnetic fields of frequencies between d.c. and 100 MHz and field strengths between $10^{-3}$ and 35 oe.

Another still further object of the subject invention is the provision of a new and improved magnetometer wherein a high index of modulation can be easily obtained.

Briefly, in accordance with this invention the foregoing and other objects are attained by placing a thin-film sensor in an external magnetic field to be measured and applying an electromagnetic signal to the thin-film sensor which is amplitude modulated by the external magnetic field and is then measured by detecting the amount of voltage reflected from the thin-film sensor.

BRIEF DESCRIPTION OF THE DRAWING

A more complete appreciation of the invention will be readily appreciated as the same becomes better understood by reference to the following detailed description when considered in connection with accompanying drawings wherein.

DESCRIPTION OF THE PREFERRED EMBODIMENT

Figure 1:
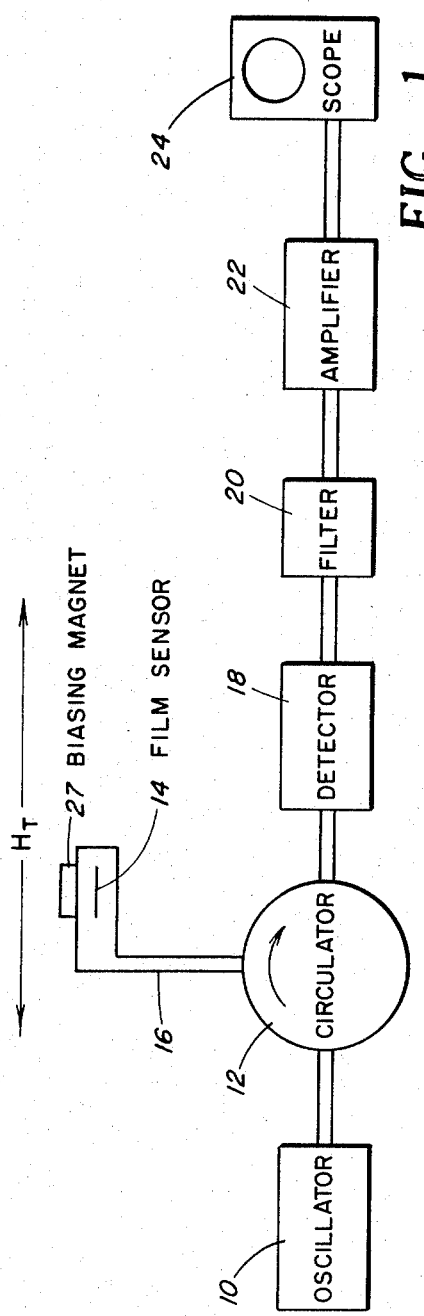
FIG. 1 is a block diagram showing one preferred embodiment of a ferromagnetic resonance magnetometer in accordance with this invention.

Referring now to the drawings wherein like reference numerals designate identical, or corresponding parts throughout the several views, and more particularly to FIG. 1 thereof wherein a magnetometer in accordance with the present invention is shown as consisting of a source of electromagnetic carrier signal of a frequency of 10 MHz to 2 GHz such as an oscillator 10 which supplies a carrier signal through a unidirectional flow circulator 12 to a thin-film sensor 14 by way of a transmission line 16. By way of example, the thin-film sensor 14 may consist of thin-films of 80 percent nickel and 20 percent iron with zero magneto-striction. It will be readily apparent however, to those of ordinary skill in the art that thin-films of other alloys and percentage combination may also be used. Transmission line 16, by way of example, may be a 50 ohm cable. The high frequency electromagnetic carrier signal allows the use of a single long transmission line which makes the magnetometer of the present invention particularly adaptable for field use. When the thin-film sensor is placed in an external magnetic field, shown as $H_t$, the reflected carrier signal 10 will be amplitude modulated by the influence of the external magnetic field on the sensor 14. The modulated carrier wave is then detected by a detector 18 which for example may be a full wave rectifier, and filtered by a low pass filter 20. The filter 20 is used to smooth the output of detector 18 so that the ripple will not saturate an amplifier 22 which may follow. After the modulated carrier wave is detected, filtered and amplified it is applied to an oscilloscope 24. The vertical deflection of the oscilloscope 24 is proportional to the voltage amplitude of the wave reflected from the impedance load provided by the thin-film sensor 14 at the end of the transmission line 16. This reflected wave is in turn a measure of the external magnetic field $H_t$ into which the thin-film was inserted.

Figure 2:
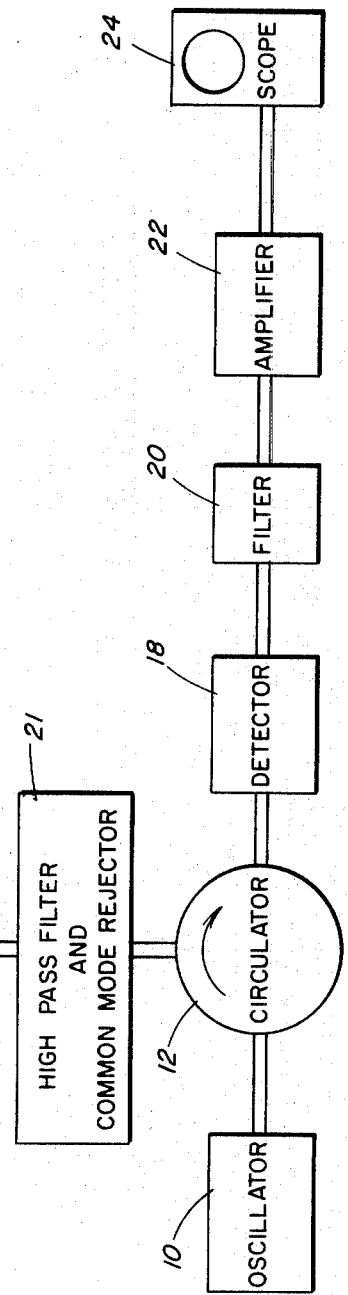
FIG. 2 is a schematic illustration of another embodiment of a ferromagnetic resonance magnetometer in accordance with this invention.

It should be understood that modifications may be made to the afore described embodiment. For example, as shown in FIG. 2 a conventional high-pass filter and common mode rejector 21 may be inserted into transmission line 16 to eliminate any current induced by the electrical fields associated with the dynamic magnetic fields present. Additionally a directional coupler may be substituted for circulator 12.

In actual operation, the thin-film sensor 14 is coupled to the transmission line 16, in a manner more fully explained hereinafter in reference to FIGS. 3A, 3B and 3C such that at the peak of the resonance curve of the thin-film i.e., the point ω in FIG. 4, the thin-film sensor provides a matched impedance load for the transmission line 16 and there is no reflected wave. At fields far from the resonance field the thin-film provides only a small reactive impedance and the incident wave is almost totally reflected. With a fixed carrier signal the thin-film is then biased at point P by a ceramic permanent magnet 27 (shown in FIGS. 1 and 2) with an initial permeability near unity and magnetic field strength $H_B$ so that with no external magnetic field present, the voltage amplitude of the reflected wave is approximately one-half the incident wave. By choosing such a biasing point the thin-film sensor is allowed to operate in a reasonably linear range. This linear operating range is shown by the solid linear line in FIG. 4. This linear relationship between the voltage amplitude of the reflected wave and the magnetic field allows for an accurate measurement of the external magnetic field to be readily obtained.

The biasing magnets used are economical, weighing but a few ounces. For example, for carrier frequencies between 300 MHz and 1.3 GHz, small biasing fields between 1 and 60 Oe need only be provided. It should be understood, however, that other conventional magnetic biasing methods may be used. When the thin-film sensor is placed in an external magnetic field $H_t$ to be detected, it will add to or subtract from the biasing field increasing or decreasing the amplitude of the reflected wave depending upon the direction of the field. The voltage amplitude of the reflected wave thus gives a direct measurement of the external magnetic field $H_t$. When sufficiently high carrier frequencies are used, the thin-film magnetometer may have a response time of less than 4 nsec. In addition, the magnetometer of the present invention responds linearly with a large dynamic range. In particular, measurement of magnetic fields of frequencies between d.c. and 100 MHz and field strength between $10^{-3}$ Oe and 35 Oe may be readily realized. It should be understood however that by slight modification ranges larger than those stated above can be obtained. For example, the sensitivity of the magnetometer is determined by the line width of the thin-film used, the band width required, and the transmission line used. For narrower band width, smaller fields can be measured. For larger line widths greater fields may be measured. It is further to be understood that any desired combination of the above changes can be readily made.

Considering the fact that the information about the external magnetic field $H_t$ is gained through amplitude modulation of the carrier signal, it is desirable to have as high an index of modulation as possible in order to minimize the noise. When the thin-film sensor is matched to the transmission line at resonance, the reflected carrier frequency can be amplitude modulated up to 70 percent by the thin-film sensor with the response linear to within 3 percent.

Figure 3A:
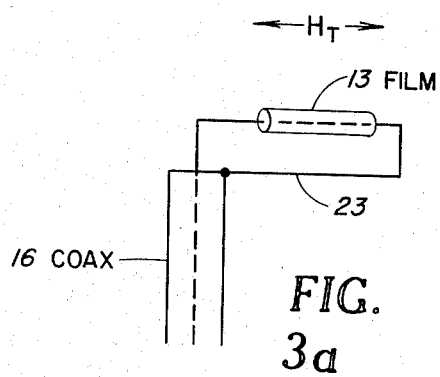
FIGS. 3A, 3B and 3C illustrate three techniques for matching a thin-film sensor to a transmission line.
Figure 3B:
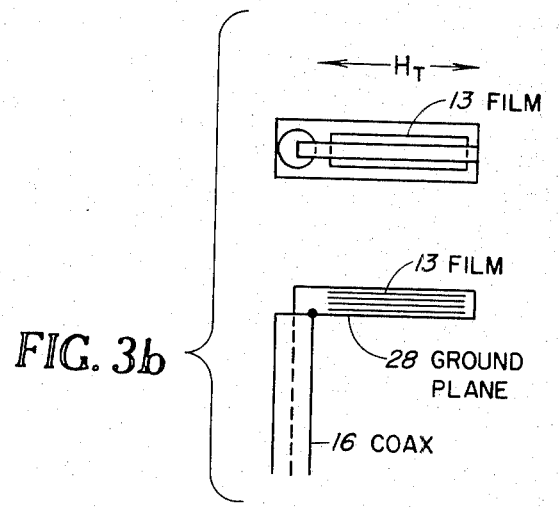
Figure 3C:
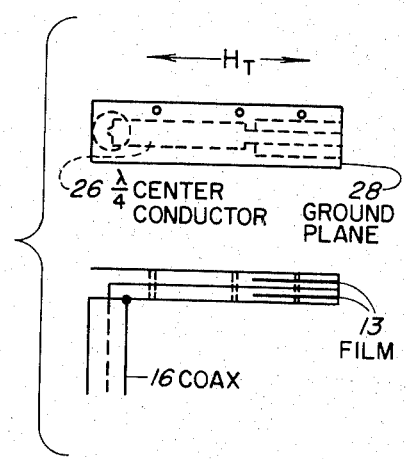
Figure 4:
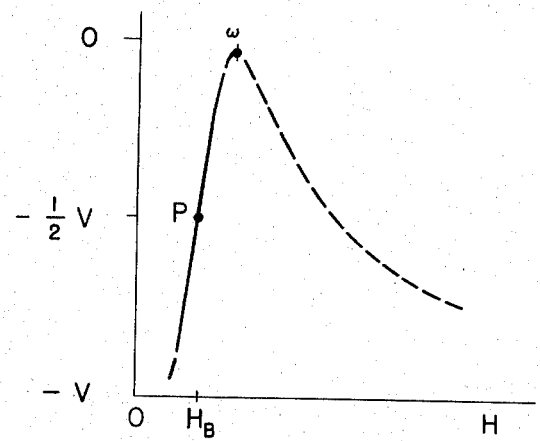
FIG. 4 illustrates a typical resonance curve for the voltage reflected from a thin-film sensor as a function of magnetic field.

Three methods of matching the impedance provided by the thin-film at resonance to the transmission line are shown in FIGS. 3A, 3B and 3C.

In the first method shown in FIG. 3A, a magnetic film 1,500 A thick is deposited on a one micron thick layer of silicon monoxide which has been previously deposited on a 1,000 A of layer of sodium chloride. All the layers are made by vacuum deposition onto a heated glass substrate. When water is applied to the completed film, the salt is desolved, and the silicon monoxide magnetic thin-film layer 13 is removed from the glass substrate and wound around a one mm copper wire 23. The wire 23 is connected to the end of the transmission line 16.

A second method is shown in FIG. 3B. Thin-films 13 on thin glass substrates about 0.1 mm are stacked and placed in a shorted loop at the end of transmission line 16. The number of films required varies depending on the desired thickness, line width, and frequency. The dimensions of the thin-films used vary depending on frequency and are always shorter than one eighth the wavelength. The width normally used is about 0.5 cm.

The third method shown in FIG. 3C utilizes a quarter wave matching section to match thin-films 13 on glass substrates placed between the center conductor 26 and ground planes 28 of strip lines just before a short.

What is claimed and desired to be secured by Letters Patent of the United States is:

1. A ferromagnetic resonance magnetometer comprising:
   a thin-film sensor formed of ferromagnetic material,
   means biasing said thin-film sensor near its ferromagnetic resonance by a ceramic permanent magnet with an initial permeability near unity,
   means generating a fixed period, extremely high frequency electromagnetic signal which is modulated when said sensor defects an external magnetic field,
   transmission line means coupled to said generating means and to said thin-film sensor and impedance matched to said thin-film sensor for applying said generated electromagnetic signal to said sensor and for transmitting the reflected signal therefrom,
   means responsive to the amplitude of said reflected signal as it varies when said ferromagnetic resonance is shifted by said external magnetic field, and
   means coupled to said sensor and said reflected signal responsive means for effecting the unidirectional signal flow from said sensor to said reflected signal responsive means.

2. A ferromagnetic resonance magnetometer as in claim 1 wherein said unidirectional signal flow means is a circulator.

3. A ferromagnetic resonance magnetometer as in claim 1 wherein said responsive means comprises a detector circuit for detecting the voltage amplitude of said reflected signal.

4. A ferromagnetic resonance magnetometer as in claim 3 wherein said responsive means further comprises a low pass filter for smoothing the output of said detector circuit, an amplifier for amplifying said smoothed output, and an oscilloscope for directly determining the magnitude of said magnetic field.

5. A ferromagnetic resonance magnetometer as in claim 1 wherein a high pass filter and a common mode rejector are inserted into said transmission line means for eliminating induced currents.

6. A ferromagnetic resonance magnetometer as in claim 1 wherein said thin-film sensor comprises a thin-film wound around a fine wire, said wire coupled to said transmission line, whereby said transmission line is impedance matched to said thin-film sensor.

7. A ferromagnetic resonance magnetometer as in claim 1 wherein said thin-film sensor comprises a stack of thin-films, each film mounted on a thin substrate, said thin-films coupled to an end of said transmission line in a shorted loop whereby said transmission line is impedance matched to said thin-film sensor.

* * * * *